United States Patent
Ged et al.

(10) Patent No.: US 12,093,943 B2
(45) Date of Patent: Sep. 17, 2024

(54) METHODS, MODULE AND BLOCKCHAIN FOR DISTRIBUTED PUBLIC KEYSTORE

(71) Applicant: WONE SAGL, Lugano (CH)

(72) Inventors: Joseph Ged, Paris (FR); David J Khoury, Skärholmen (SE); Elie F Kfoury, South Carolina, SC (US)

(73) Assignee: WONE SAGL, Lugano (CH)

( * ) Notice: Subject to any disclaimer, the term of this patent is extended or adjusted under 35 U.S.C. 154(b) by 176 days.

(21) Appl. No.: 17/915,287

(22) PCT Filed: Feb. 10, 2022

(86) PCT No.: PCT/EP2022/053305
§ 371 (c)(1),
(2) Date: Sep. 28, 2022

(87) PCT Pub. No.: WO2022/171770
PCT Pub. Date: Aug. 18, 2022

(65) Prior Publication Data
US 2023/0146338 A1    May 11, 2023

(30) Foreign Application Priority Data

Feb. 11, 2021 (SE) .................................. 2150151-5

(51) Int. Cl.
*G06Q 20/38*  (2012.01)
*G06Q 20/06*  (2012.01)
*G06Q 20/40*  (2012.01)

(52) U.S. Cl.
CPC ....... *G06Q 20/3829* (2013.01); *G06Q 20/065* (2013.01); *G06Q 20/4014* (2013.01)

(58) Field of Classification Search
CPC ............. G06Q 20/3829; G06Q 20/065; G06Q 20/4014
See application file for complete search history.

(56) References Cited

U.S. PATENT DOCUMENTS

| | | | |
|---|---|---|---|
| 2018/0097635 A1* | 4/2018 | Moses ....................... | H04L 9/30 |
| 2018/0183587 A1* | 6/2018 | Won ....................... | H04L 63/166 |

(Continued)

FOREIGN PATENT DOCUMENTS

GB    2583767 A    11/2020

OTHER PUBLICATIONS

Junjun Lou, et al., A Blockchain-based Key Management Scheme for Named Data Networking, Jan. 10, 2019, IEEE, pp. 141-146 (Year: 2019).*

(Continued)

*Primary Examiner* — Nilesh B Khatri
(74) *Attorney, Agent, or Firm* — Tucker Ellis LLP

(57) ABSTRACT

Disclosed is a universal plug-in Distributed Public Keystore (DPK) module provided on a user equipment. The DPK module approves its identifier with a Public Key Manager (PKM) and obtains cryptocurrency from the PKM. The APPs on the user equipment generate and transmit user public keys to the DPK module. The DPK module generated its own user public key as well. After a storage transaction requirement by the DPK module is approved by a blockchain, the DPK module sends obtained user public keys to the blockchain so that the user public keys are stored in the blockchain. The user public keys are never stored outside the blockchain or in a third part server. The stored user public keys are retrieved to the DPK module when necessary, such as when a P2P communication is performed by any of the APPs.

15 Claims, 7 Drawing Sheets

(56) References Cited

U.S. PATENT DOCUMENTS

| | | |
|---|---|---|
| 2019/0036932 A1 | 1/2019 | Bathen et al. |
| 2019/0123895 A1 | 4/2019 | Blake et al. |
| 2020/0021588 A1* | 1/2020 | Wittrock ............ G07C 9/00174 |
| 2020/0059354 A1* | 2/2020 | Yang ..................... H04L 9/0825 |
| 2021/0182806 A1* | 6/2021 | Ornelas .............. G06Q 20/3825 |
| 2022/0245724 A1* | 8/2022 | Nolan .................. G06Q 20/401 |

OTHER PUBLICATIONS

Swedish Search Report of corresponding Swedish patent application No. 2150151-5, dated Sep. 24, 2021, 1 page.

* cited by examiner

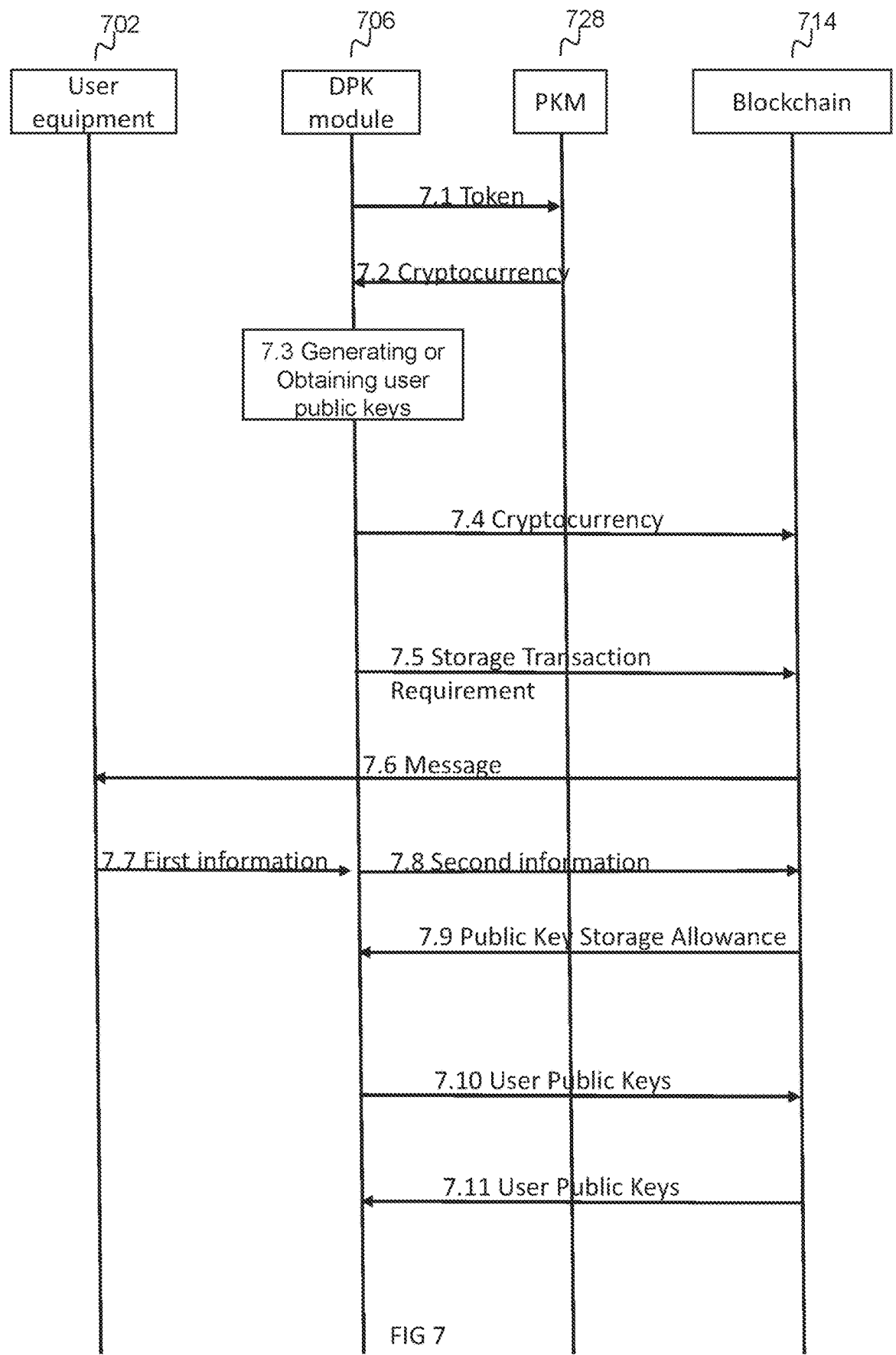

METHODS, MODULE AND BLOCKCHAIN FOR DISTRIBUTED PUBLIC KEYSTORE

TECHNICAL FIELD

The present disclosure relates generally to methods, module and blockchain for distributed public keystore. The present disclosure further relates to computer programs corresponding to the above methods, modules and blockchain.

BACKGROUND

Nowadays, real-time communication is widely used by all kinds of communication devices, hereinafter called user equipment (UE). For example, Voice over Internet Protocol (VOIP) or Voice over Long-Term Evolution (VOLTE) are utilized by communication applications (APPs) on the user equipment to perform real-time Person-To-Person (P2P) communications.

Information on security and privacy are critical issues facing the P2P communications. In prior art methods, user public keys/certificates generated by the communication applications are stored in a Certificate Authority (CA). CA is a public/third party infrastructure that is positioned in the communication network. The CA must be secure and trusted. However, such methods require a large infrastructure to manage all the public keys/certificates. The capacity and robustness requirement of the CA is very high. Once the CA is down for some reason, the communications for a large number of applications are affected. Further, the security of the CA is of high importance as the public keys/certificates are secret data needed to be well-protected from any fraudulent users.

Furthermore, if the applications store the user public keys/certificates to the CA, the storage transactions must be approved, otherwise a malicious user can also get access to the infrastructure and perform write/rewrite operation on the stored user public keys/certificates.

Therefore, there is need for a solution which helps P2P communication applications on user equipment performing in a more secure way. Another need may be for a solution that can handle user public keys/certificates robustly and securely. There is also a need for a solution that can efficiently handle large amount of user public keys/certificates.

SUMMARY

It is an object of the invention to address at least some of the problems and issues outlined above. It is possible to achieve these objects and others by using methods, modules and wireless devices as defined in the attached independent claims.

According to one aspect, a method performed by a Distributed Public Keystore module operated on a user equipment is provided. The method comprising: transmitting a Token of the DPK module to an external device having cryptocurrency so the external device can approve the DPK module and obtaining cryptocurrency from the external device to a wallet of the DPK module, in response to an approval of the Token by the external device. The method further comprises obtaining one or more user public keys generated by one or more Applications on the user equipment and transmitting the cryptocurrency in the wallet of the DPK module to a blockchain. The method further comprises sending a storage transaction requirement to the blockchain relating to the cryptocurrency and receiving a first information from a user of the user equipment, the first information originating from a message received from the blockchain, the message being received via the communication network to the user equipment, the first information being related to approval by the blockchain of the storage transaction requirement. The method further comprises sending a second information to the blockchain for approval and receiving from the blockchain, a public key storage allowance, relating to an approval by the blockchain for the sent storage transaction requirement based on the sent second information. The method further comprises sending the one or more user public keys to the blockchain for storage in the blockchain, based on the public key storage allowance. The method further comprises retrieving the one or more stored public key from the blockchain when the one or more public key is needed by the DPK module.

According to another aspect, a method performed by a blockchain connected to a user equipment is provided. The method comprising: receiving cryptocurrency from a wallet in a Distributed Public Keystore module operated on the user equipment and receiving a storage transaction requirement from the DPK module relating to the cryptocurrency. The method further comprises sending a message for approving the DPK module via a communication network to the user equipment, the message comprising a first information being sent to the DPK module via the user equipment. The method further comprises receiving a second information from the DPK module, the second information is based on the first information. The method further comprises approving the DPK module using the received second information. The method further comprises sending a public key storage allowance to the DPK module, based on the approving. The method further comprises receiving one or more user public key from the DPK module and storing the received one or more user public key. The method further comprises transmitting the stored one or more public key to the DPK module in response to a retrieving requirement from the DPK module.

According to another aspect, a Distributed Public Keystore module operable on a user equipment is provided. The DPK module is configured for two-way communication with a blockchain, the DPK module comprising a processing unit and a memory, the memory containing instructions executable by the processing unit, whereby the DPK module is operative for: transmitting a Token of the DPK module to an external device having cryptocurrency so the external device can approve the DPK module and obtaining cryptocurrency from the external device to a wallet of the DPK module, in response to an approval of the Token by the external device. The DPK module is further operative for obtaining one or more user public keys generated by one or more Applications on the user equipment and transmitting the cryptocurrency in the wallet of the DPK module to a blockchain. The DPK module is further operative for sending a storage transaction requirement to the blockchain relating to the cryptocurrency and receiving a first information from a user of the user equipment, the first information originating from a message received from the blockchain, the message being received via the communication network to the user equipment, the first information being related to approval by the blockchain of the storage transaction requirement. The DPK module is further operative for sending a second information to the blockchain for approval and receiving from the blockchain, a public key storage allowance, relating to an approval by the blockchain for the sent storage transaction requirement based on the sent second information. The DPK module is further operative for sending the one or more user public keys to the blockchain for storage in the blockchain, based on the public key storage allowance. The DPK module is further operative for retrieving the one or more stored public key from the blockchain when the one or more public key is needed by the DPK module.

According to another aspect, a blockchain is provided. The blockchain is configured for two-way communication with a number of user equipment and communication networks, the blockchain comprising a processing unit and a memory, the memory containing instructions executable by said processing unit, whereby the blockchain is operative for: receiving cryptocurrency from a wallet in a Distributed Public Keystore module operated on the user equipment and receiving a storage transaction requirement from the DPK module relating to the cryptocurrency. The blockchain is further operative for sending a message for approving the DPK module via a communication network to the user equipment, the message comprising a first information being sent to the DPK module via the user equipment. The blockchain is further operative for receiving a second information from the DPK module, the second information is based on the first information. The blockchain is further operative for approving the DPK module using the received second information. The blockchain is further operative for sending a public key storage allowance to the DPK module, based on the approving. The blockchain is further operative for receiving one or more user public key from the DPK module and storing the received one or more user public key. The blockchain is further operative for transmitting the stored one or more public key to the DPK module in response to a retrieving requirement from the DPK module.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 7 is a signaling diagram illustrating an example of a procedure when the solution is performed, according to further possible embodiments.

DETAILED DESCRIPTION

Briefly described, a universal plug-in Distributed Public Keystore (DPK) module is provided on a user equipment. The DPK module approves its identifier with a Public Key Manager (PKM) and obtains cryptocurrency from the PKM. The APPs on the user equipment generate and transmit user public keys/user information to the DPK module. The DPK module generated its own user public key as well. After a storage transaction requirement by the DPK module is approved by a blockchain, the DPK module sends received user public keys/user information to the blockchain so that the user public keys/user information are stored in the blockchain. The user public keys/user information are never stored outside the blockchain or in a third part server. The stored user public keys/user information are retrieved to the DPK module when necessary, e.g., when a P2P communication is performed by any of the APPs.

Figure 1:
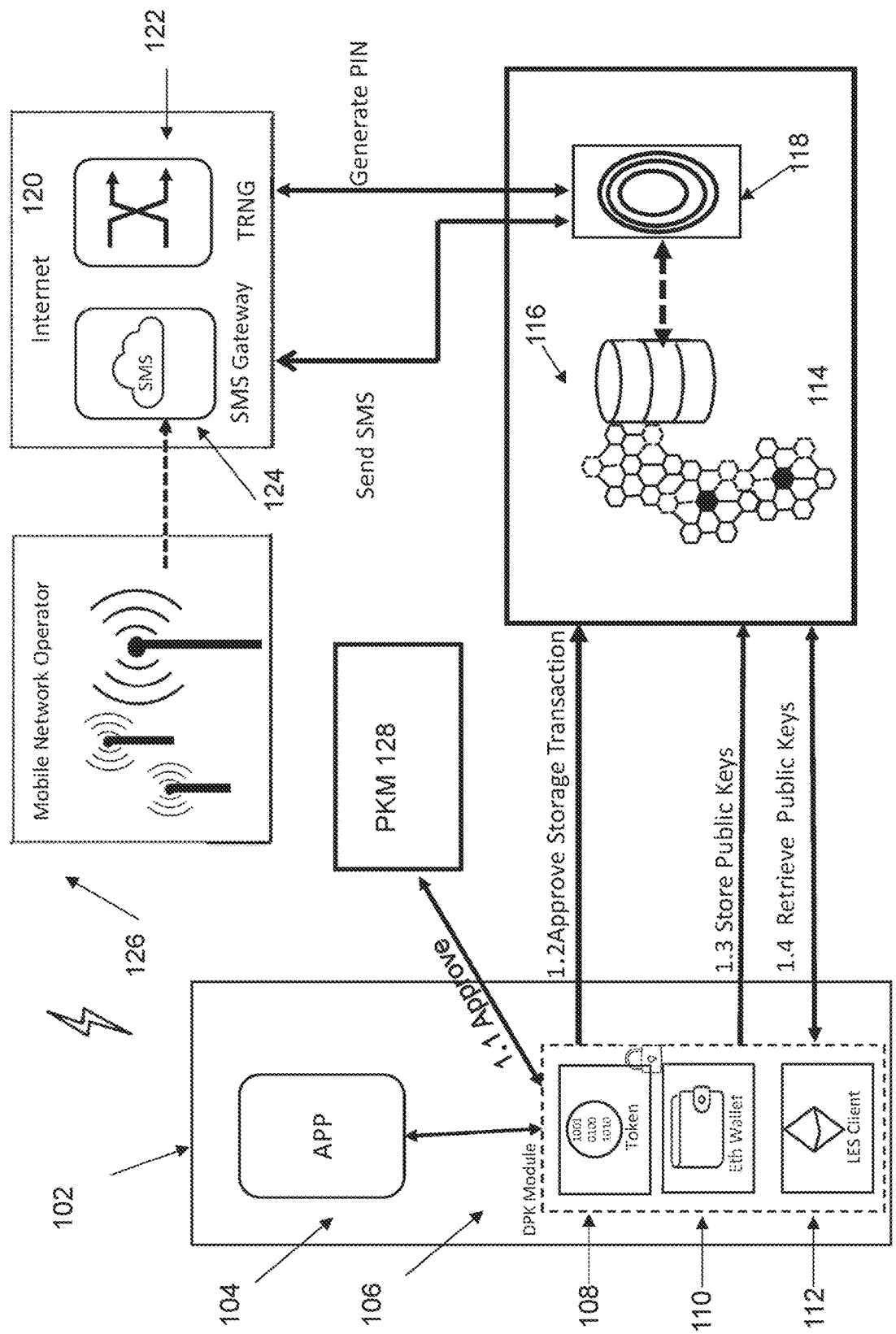
FIG. 1 is a communication scenario illustrating a system of a Distributed Public Keystore module and a blockchain.

FIG. 1 shows a system comprising a DPK module 106 and a blockchain 114 that is arranged to communicate with a communication device aka user equipment 102 on which the DPK module 106 is arranged.

A blockchain 114 is a distributed data where copies are stored on multiple nodes simultaneously. There is no single controlling computer in charge of maintaining the data, or what is referred to as the ledger. Blockchain is more than just a decentralized digital ledger; It may also contain data and transaction records. The use of the blockchain technology deals with confirming the integrity of data associated with the transaction. This feature is key for securing the integrity of networked devices. Examples of blockchain 114 are public blockchains like Bitcoin and Ethereum™, private blockchains like Hyperledger™ and R3 Corda™ and hybrid blockchains like Dragonchain™.

The user equipment 102 may be any type of device capable of communicating with the blockchain 114, mobile network and Internet. For example, the user equipment 102 may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Referring to FIG. 1, a user equipment 102 is communicatively connected to a blockchain 114 so that a two-way communication can be performed between the user equipment 102 and the blockchain 114. The blockchain 114 here is an Ethereum as an example. The user equipment 102 is also communicatively connected to a PKM 128 in the same way.

The user equipment 102 includes one or more APP 104. The APP 104 can be common applications that the user of the user equipment 102 downloads from an application market, e.g. Apple APP Store™, Google Play™. The APP 104 can be e.g., real-time communication APPs. A DPK module 106 is also downloaded from an application market by the user. A DPK module 106 can be downloaded independently or as a module part of other APP. The DPK module 106 is a general plug-in module that can be embedded into any type of client devices aka user equipment (IoT sensors, mobile devices, SIM, SD card, eSIM, etc. . . . ), web-browser, and servers. The DPK module 106 can interact with the APP 104 and the blockchain 114 via different interfaces. When the APP 104 generate user public keys/user information, the user public keys/user information are transmitted to the DPK module 106 for further processing. Meanwhile, the DPK module 106 itself generates its own user public key.

The DPK module 106 includes a Token 108, a wallet 110 and a blockchain protocol client, in this case a Light Ethereum Subprotocol (LES) Client 112. The Token 108 operates as an identifier of the DPK module 106 when the DPK module 106 is approved by the PKM 128. In a initialization step, the wallet 110 is empty. After the Token 108 is approved by the PKM 128, the DPK module 106 obtains cryptocurrency e.g., Ether from the PKM 128 and stores into its wallet 110. Generally speaking, the PKM 128 is not the only type of device that the DPK module 106 can get cryptocurrency from. The DPK module 106 can obtain cryptocurrency from all kinds of external devices which provide cryptocurrency as long as the Token 108 of the DPK module 106 can be approved by the external device and the cryptocurrency transmission is secure. The external device can be any server/equipment accessible via network and providing cryptocurrency. The LES client 112 is a blockchain client installed on all type of UEs (smart phones, IoT devices, laptops, etc.) which has a smaller size and needs less space than ordinary blockchain client.

A PKM 128 or any other external cryptocurrency providing device may also be included in the whole system. The PKM 128 receives a Token 108 of the DPK module. The Token 108 acts as an identifier of the DPK module 106. When receiving the Token, the PKM 128 tries to approve the Token 108. When the Token 108 is approved successfully by the PKM 128, the PKM 128 transfers cryptocurrency, e.g., Ether to the wallet 110 so that the cryptocurrency can be sent to the blockchain 114 as payment in further interactions. This step is the 1.1 Approve step illustrated in FIG. 1.

A blockchain 114 includes multiple smart contracts 116 which perform different functions, and a secure interface 118. A smart contract is defined as a computer code running over blockchain, capable of exchanging any value (money, property, etc.) without the need of a third party. The smart contracts offer the following advantages over the existing computer programs:
1. Autonomous: their execution is managed by the network,
2. Trust-less: the blockchain ledger's version is validated with consensus among nodes,
3. Data safe: the application's data remain permanently in the blockchain,
4. Transparent: smart contract's code and storage are publicly available.

The blockchain 114 interacts with the DPK module 106 via interfaces of the blockchain 114. The DPK module 106 obtains user public keys from the APPs 104 or from itself. The DPK module 106 can obtain not only user public keys, but also other crucial data that are related to the user public keys, e.g., APP identifications and user information related to an application, etc. The user information related to the applications is, e.g., information of the user to be transferred between the user equipment and other device using the application. These data can also be stored in the blockchain. The DPK module 106 transmits cryptocurrency to the blockchain 114 so that further interactions with the blockchain 114 are "paid". Then the DPK module 106 sends a storage transaction requirement to the blockchain 114, the storage transaction requirement is related to the cryptocurrency which has been "paid" before.

After receiving the storage transaction requirement from the DPK module 106, one of the multiple smart contracts 116 sends a Hypertext Transfer Protocol (HTTP) request to the secure interface 118 of the blockchain 114. The secure interface 118 offers a secure connection between the smart contracts and external web application programming interfaces (APIs). In some embodiments, the secure interface 118 is an Oraclize contract. The Oraclize contract is a smart contract situated between the Blockchain network and the public Internet. It helps smart contracts issue requests to the Internet via HTTP(S) POST and GET methods to gather information or post data. The main challenge with oracles is trust. Fortunately, recent substantial research attempts succeeded in solving these trust issues by providing different trusted computing techniques.

The HTTP request is sent to a True Random Number Generator (TRNG) server 122 situated in the Internet 120 to get a random Personal Identification Number (PIN) code. Transport Layer Security Notary (TLSNotary) is considered as a TRNG. Oraclize for instance, provides an enhanced oracle network that uses the TLSNotary proof, which returns a cryptographic proof for the user showing that a certain HTTP request returned data from the right server at a specific time. Hence, Oraclize refers to their service as "provably-honest". Other attestators building TRNG like Town Crier company uses Trusted Execution Environments (TEE) such as the Intel Software Guard Extensions (SGX) to guarantee that the returned data is not tampered with. Other hardware-based techniques include Qualcomm TEE, Android safetyNet, Ledger Nano S attestation, Samsung Knox™ etc.

When the PIN code is sent back to the smart contract 116, the smart contract 116 again connects via the secure interface 118 to a Short Message Service (SMS) Gateway 124 and sends the PIN code to the SMS gateway. The SMS Gateway sends an SMS to the user equipment 102 containing the PIN as a payload via a Mobile Network Operator 126. The PIN can be included in the message directly or indirectly.

If the PIN is contained in the message directly/explicitly, once the SMS is received by the user equipment 102, a user of the user equipment 102 reads the SMS including the PIN code and inputs the PIN code to the DPK module 106 via a user interface, of the UE 102. If the PIN is contained in the message indirectly, e.g., only an information related to the PIN is contained in the message, the user uses the information to generate the PIN. For example, the user uses a hardware "Authorization Token" to generate a PIN based on the information. Then the user inputs the PIN code to the DPK module 106. Instructions to the user to input a PIN code can be displayed on the user equipment 102. The DPK module 106 then transmits the inputted PIN code to the blockchain 114. The blockchain 114 compares if the received PIN code from the DPK module 106 is consistent with the PIN code originating from the TRNG server 122. If so, the storage transaction requirement from the DPK module 106 is approved by the blockchain 114 and a public key storage allowance is sent to the DPK module 106. The whole process of storage transaction approvement is illustrated as step 1.2 in FIG. 1.

The blockchain 114 keeps two tables, each table having entries containing user public key connected to user equipment and wallet address, one table is PendingList, the other table is ApprovedList. Once the storage transaction requirement from the DPK module 106 is approved by the blockchain 114, the correspondent entry in the PendingList is entered into the ApprovedList. An example of the PendingList and the ApprovedList is shown in Table 1. In the embodiment of Table 1, the user equipment 102 is a mobile phone.

TABLE 1

| PendingList | | | | ApprovedList | | |
| --- | --- | --- | --- | --- | --- | --- |
| Phone Number | User Public Key | Wallet Address | | Phone Number | User Public Key | Wallet Address |
| 111234 | A4334... | OXAAA... | → | 111234 | A4334...  | OXAAA... |

After receiving the public key storage allowance, the DPK module 106 sends the user public keys from the APPs 104 or its own user public key to the blockchain 114 for storage. Because the user public keys of the APPs 104 or DPK module 106 are stored in the blockchain 114, and not in a centralized infrastructure, the security of the storage is improved. The user public keys are never stored outside the blockchain or in a third part server. Furthermore, since the storage transaction requirements are approved by the blockchain 114, the stored user public keys cannot be overwritten by other malicious users. This storing step is illustrated step 1.3 in FIG. 1.

When any one of the APPs 104 or the DPK module 106 itself needs the user public key stored at the blockchain 114, the DPK module retrieves 1.4 the stored public key from the blockchain 114. When transmitting cryptocurrency from the DPK module 106 to the blockchain 114, the wallet address of the wallet 110 is the unique identifier of the DPK module 106 for the blockchain 114. Furthermore, if the user equipment 102 is a mobile phone, the MSISDN number of the mobile phone is connected with the wallet address of the wallet 110. This will block any malicious user with a new wallet address to change the transaction data for a spoofed phone number.

Figure 2:
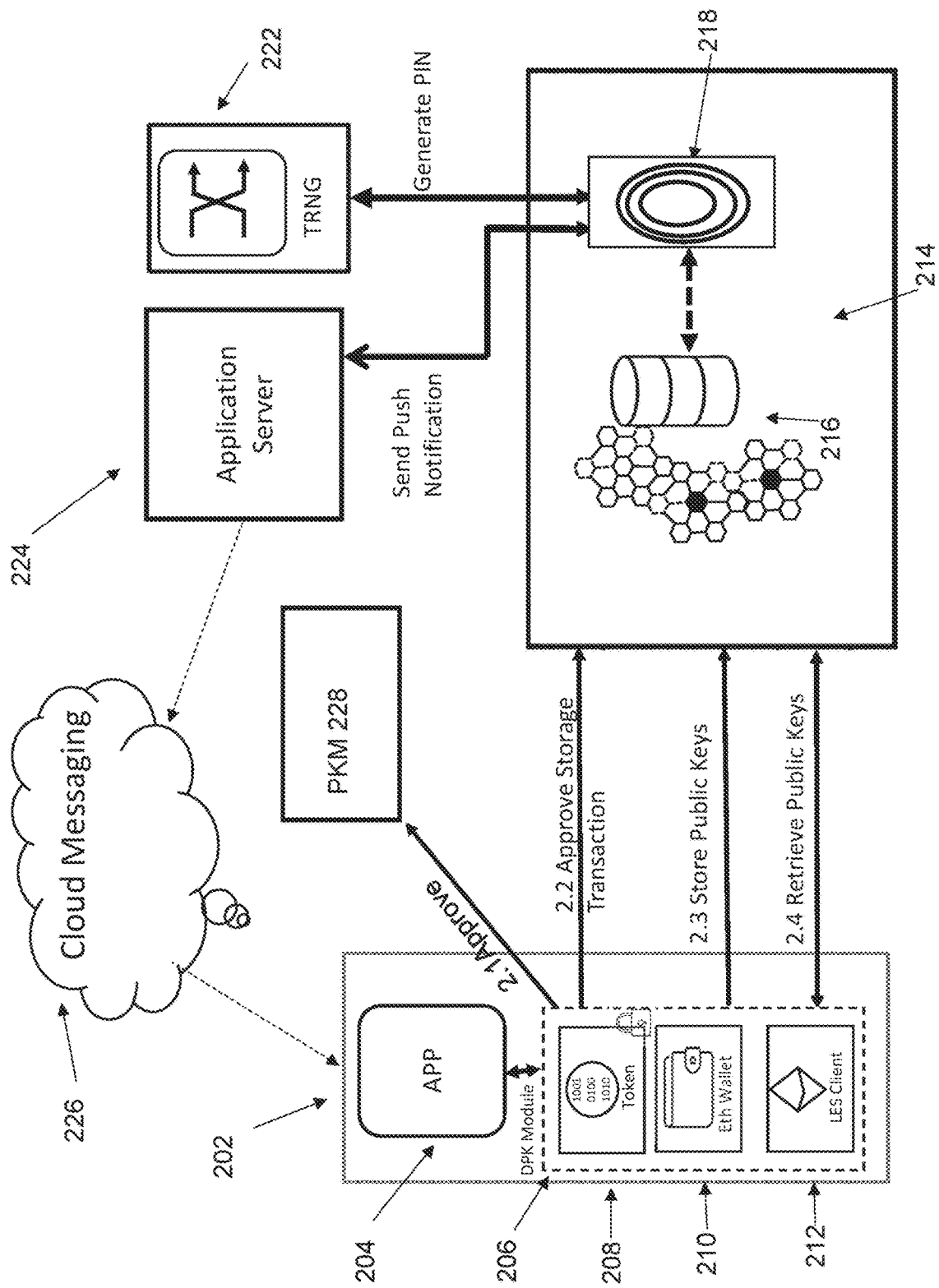
FIG. 2 is an alternative communication scenario illustrating a system of a DPK module and a blockchain.

Referring to FIG. 2, the layout of the whole system is similar to FIG. 1. The blocks 202, 204, 206, 208, 210, 212, 214, 216, 218, 222 and 228 have the same functions as the correspondent blocks 102, 104, 106, 108, 110, 112, 114, 116, 118, 122 and 128 in FIG. 1. The differences are instead of SMS gateway 124 and Mobile Network Operator 126, the solution in FIG. 2 uses Application Server 224 and Cloud Messaging 226. An example of cloud messaging is Google FCM. When the smart contract 216 receives the PIN code from the TRNG 222 via the secure interface 218, the smart contract 216 sends a push notification including the PIN code to the Application Server 224. The PIN code is included in the push notification directly or indirectly. The Application Server 224 transmits the push notification to the user equipment 202 via the Cloud Messaging 226. The user of the user equipment 202 receives the push notification. The following steps in the solution of FIG. 2 is the same as in the solution of FIG. 1.

Figure 3:
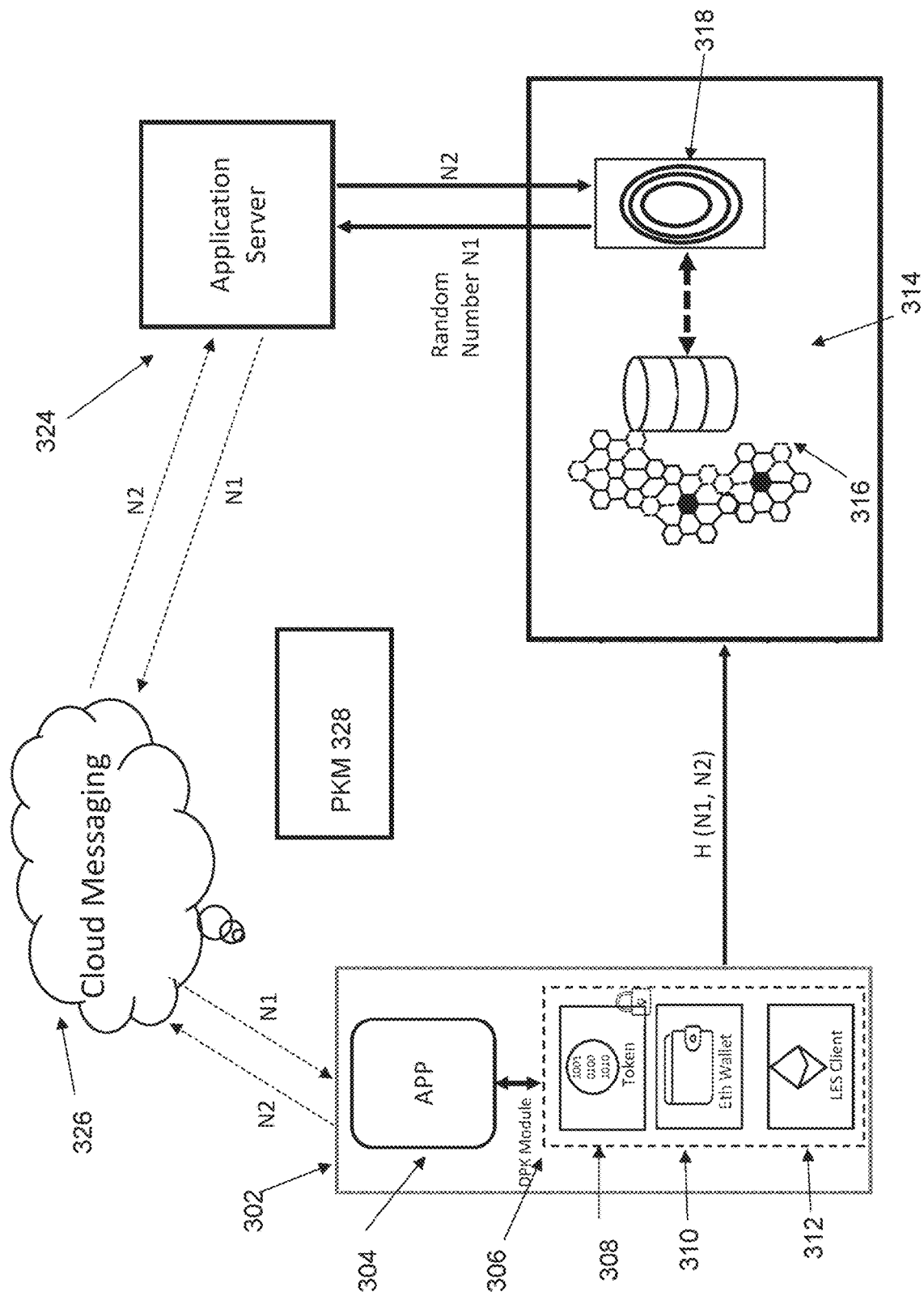
FIG. 3 is another alternative communication scenario illustrating a system of a DPK module and a blockchain, especially the approval of storage transaction requirement between the DPK module and blockchain.

Referring to FIG. 3, it illustrates another embodiment of the invention. The layout of the whole system is similar to FIG. 2. The blocks 302, 304, 306, 308, 310, 312, 314, 316, 318, 324, 326 and 328 have the same functions as the correspondent blocks 202, 204, 206, 208, 210, 212, 214, 216, 218, 224, 226 and 228 in FIG. 2. The steps of "2.1 Approve", "2.3 Store Public Keys" and "2.4 Retrieve Public Keys" are similarly performed in this embodiment as performed in the embodiment of FIG. 2, and will not be described in details here. Only the step "2.2 Approve Storage Transaction" is described here in details.

After receiving the storage transaction requirement from the DPK module 306, one of the smart contracts 316 of the blockchain 314 contacts with the secure interface 318 of the blockchain 314. The secure interface 318 generates a random number N1 and sends out a message comprising the random number N1 via an external communication network to an Application Server 324. The message is transmitted through the Application Server 324 and a Cloud Messaging service or network 326 to the user equipment 302. The random number N1 is also stored in the blockchain 314. After receiving the message, the user equipment 302 transfers the random number N1 of the message to the DPK module 306. When receiving the random number N1, the DPK module 306 generates another random number N2 itself, then calculates a function H (N1, N2) with the random numbers N1 and N2 as inputs. The function H is preinstalled in the DPK module 306 and can be any function that can be used for approvement, e.g., a Hash function.

When the function H (N1, N2) has been calculated, the DPK module 306 transmits the random number N2 and the function H (N1, N2) to the blockchain 314 simultaneously. However, the random number N2 and the function H (N1, N2) are transmitted to the blockchain 314 via different routes. The random number N2 is transmitted via an external communication network, that is, via the cloud messaging service/network 326 and the application server 324, then received by the blockchain 314 via the secure interface 318. The function H (N1, N2) is transmitted to the blockchain 314 directly via the interfaces between the DPK module 306 and the blockchain 314.

After receiving the random number N2 and the function H (N1, N2), the blockchain 314 calculates a function H' (N1, N2) with the inputs N1 and N2. The function H' is preinstalled in the blockchain 314 and consistent with the function H in the DPK module 306. After calculation, the blockchain 314 compares if the received H (N1, N2) is consistent with the calculated H' (N1, N2). If consistent, the storage transaction requirement is approved by the blockchain 314, and a public key storage allowance is sent to the DPK module 306. The whole process of "2.2 Approve storage Transaction" in this embodiment is accomplished.

Figure 4:
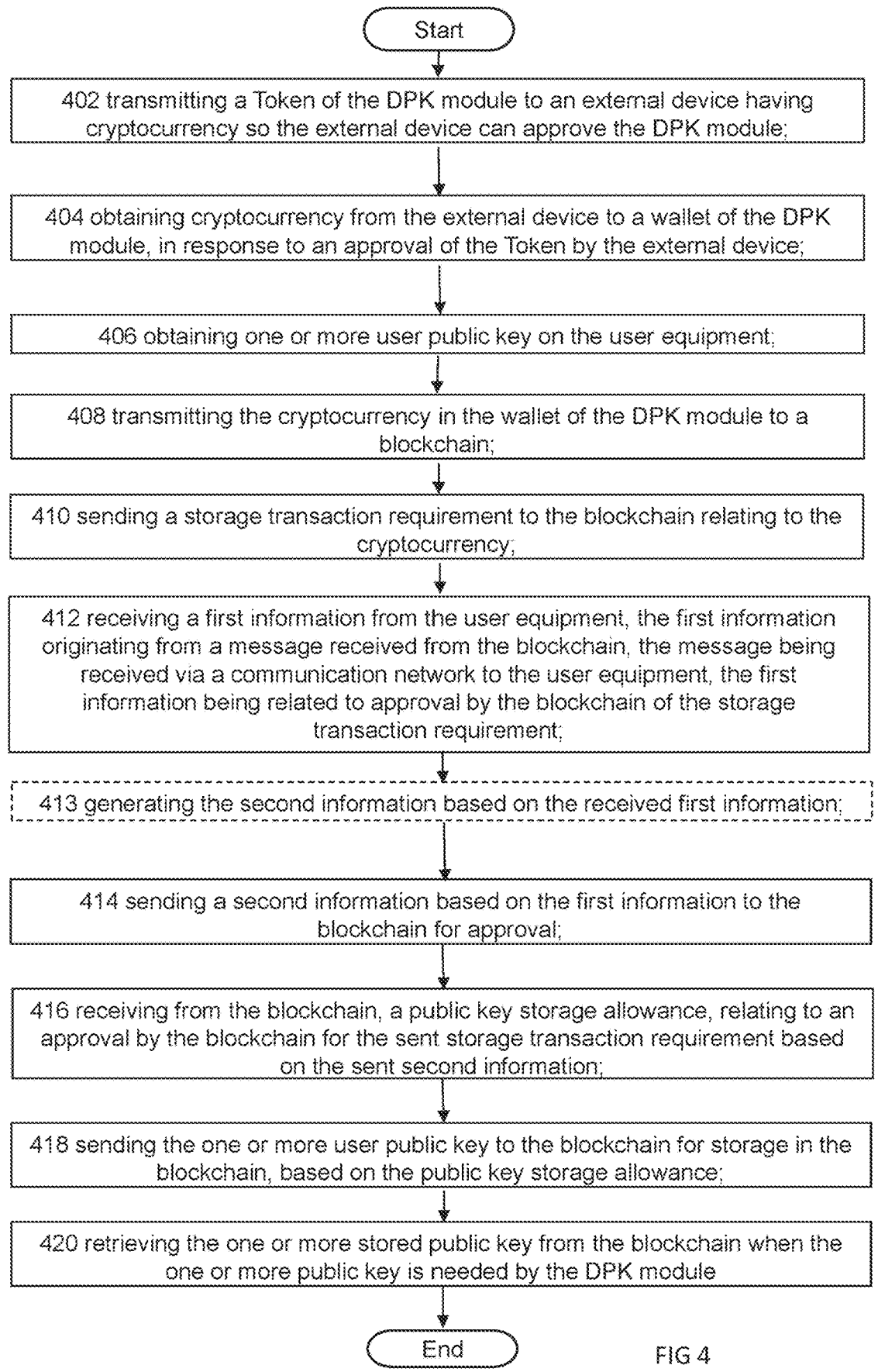
FIG. 4 is a flow chart illustrating a procedure in a DPK module, according to further possible embodiments.

FIG. 4 is a flow chart illustrating a procedure performed by a DPK module, according to further possible embodiments. The DPK module is operated on a user equipment. The steps can be understood in conjunction with FIG. 1, FIG. 2, FIG. 3 and FIG. 6. The method comprising:

Step 402: transmitting a Token of the DPK module 106, 206, 306, 606 to an external device 128, 228, 328 having cryptocurrency so the external device 128, 228, 328 can approve the DPK module 106, 206, 306, 606. The token is a unique identifier for the DPK module 106, 206, 306, 606 in the external device 128, 228, 328. In a preferred embodiment, the cryptocurrency is Ether. In another preferred embodiment, the external device 128, 228, 328 is a Public Key Manager (PKM).

Step 404: obtaining cryptocurrency from the external device 128, 228, 328 to a wallet 110, 210, 310 of the DPK module 106, 206, 306, 606, in response to an approval of the Token by the external device 128, 228, 328.

Step 406: obtaining one or more user public key on the user equipment 102, 202, 302. In a preferred embodiment, the user public keys are obtained by the DPK module 106, 206, 306, 606 from one or more Applications 104, 204, 304. In another preferred embodiment, the user public keys are obtained from the DPK module 106, 206, 306, 606 itself. That is, the user public keys are generated by the DPK module 106, 206, 306, 606. In another preferred embodiment, user information related to an application 104, 204, 304 is also obtained. The user information related to an application 104, 204, 304 is for example information of the user to be transferred between the user equipment 102, 202, 302 and other device using the application 104, 204, 304.

Step 408: transmitting the cryptocurrency in the wallet 110, 210, 310 of the DPK module 106, 206, 306, 506 to a blockchain 114, 214, 314, 614. In one preferred embodiment, the blockchain 114, 214, 314, 614 is Ethereum. In a preferred embodiment, the wallet 110, 210, 310 in the DPK module 106, 206, 306, 606 includes a wallet address, the wallet address is a unique identifier for the DPK module 106, 206, 306, 606 relating to the transmission of the cryptocurrency from the wallet 110, 210, 310 to the blockchain 114, 214, 314, 614.

Step 410: sending a storage transaction requirement to the blockchain 114, 214, 314, 614 relating to the cryptocurrency.

Step 412: receiving a first information from the user equipment 102, 202, 302, the first information originating from a message received from the blockchain 114, 214, 314, 614, the message being received via a communication network to the user equipment 102, 202, 302, the first information being related to approval by the blockchain 114, 214, 314, 614 of the storage transaction requirement.

In a preferred embodiment, the first information can be a PIN or other unique password. The PIN/password can be explicitly included the message. In another embodiment, actual PIN/password cannot be obtained directly from the message. Instead, the user gets the actual PIN/password by using the information comprised in the message. For example, the user inputs the information comprised in the message into a hardware "Authorization Token" and the "Authorization Token" generates the actual PIN/password for the user. In another embodiment, the user reads the message and is instructed to input the PIN/password into the DPK module 106, 206, 306, 606. The instructions can be displayed on the user equipment 102, 202, 303 from the DPK module 106, 206, 306, 606 or from the received message. In a preferred embodiment, the message sent from the blockchain 114, 214, 314, 614 is sent as/via SMS or cloud messaging 226. The user of the user equipment 102, 202, 302 reads the SMS/cloud messaging and inputs the PIN/password to the DPK module 106, 206, 306, 606.

In another embodiment, the first information is a random number N1. The random number N1 is comprised in a message sent from the blockchain 114, 214, 314, 614. The user equipment 102, 202, 302 obtains the random number N1 from the received message and sends the random number N1 to the DPK module 106, 206, 306, 606. In a preferred embodiment, the message sent from the blockchain 114, 214, 314, 614 is sent as/via SMS or cloud messaging 326.

Step 414: sending a second information based on the first information to the blockchain 114, 214, 314, 614 for approval.

In a preferred embodiment, if the first information is a PIN/password, the second information is also the PIN/password.

In a preferred embodiment, a step 413 is performed by the DPK module 106, 206, 306, 606 prior to the step 414. The step 413 generates the second information based on the received first information. In this embodiment, the first information is the random number N1. By receiving the random number N1, the DPK module 106, 206, 306 generates another random number N2 itself, then calculates a function H (N1, N2) having the random numbers N1 and N2 as inputs. The function H is preinstalled in the DPK module 306 and can be any function that used for approvement, e.g., Hash function. The second information is the random number N2 and the function H (N1, N2). In a preferred embodiment, in the step 414, the random number N2 and the function H (N1, N2) are sent via different routes. The random number N2 is sent via a communication network, e.g., cloud messaging, application server etc. The function H (N1, N2) is sent directly via the interfaces between the DPK module 106, 206, 306, 606 and the blockchain 114, 214, 314, 614.

Step 416: receiving from the blockchain 114, 214, 314, 614, a public key storage allowance, relating to an approval by the blockchain for the sent storage transaction requirement based on the sent second information.

Step 418: sending the one or more user public key to the blockchain 114, 214, 314, 614 for storage in the blockchain 114, 214, 314, 614, based on the public key storage allowance. In a preferred embodiment, the sending 418 of the one or more user public key to the blockchain also includes sending user information related to an application 104, 204, 304 on the user equipment 102, 202, 302, the user information related to an application 104, 204, 304 being for example information of the user to be transferred between the user equipment 102, 202, 302 and other device using the application 104, 204, 304.

Step 420: retrieving the one or more stored user public key from the blockchain 114, 214, 314, 614, when the public key is needed by the DPK module 106, 206, 306, 606. In a preferred embodiment, the stored user information related to an application 104, 204, 304 on the user equipment 102, 202, 302 is also retrieved.

Figure 5:
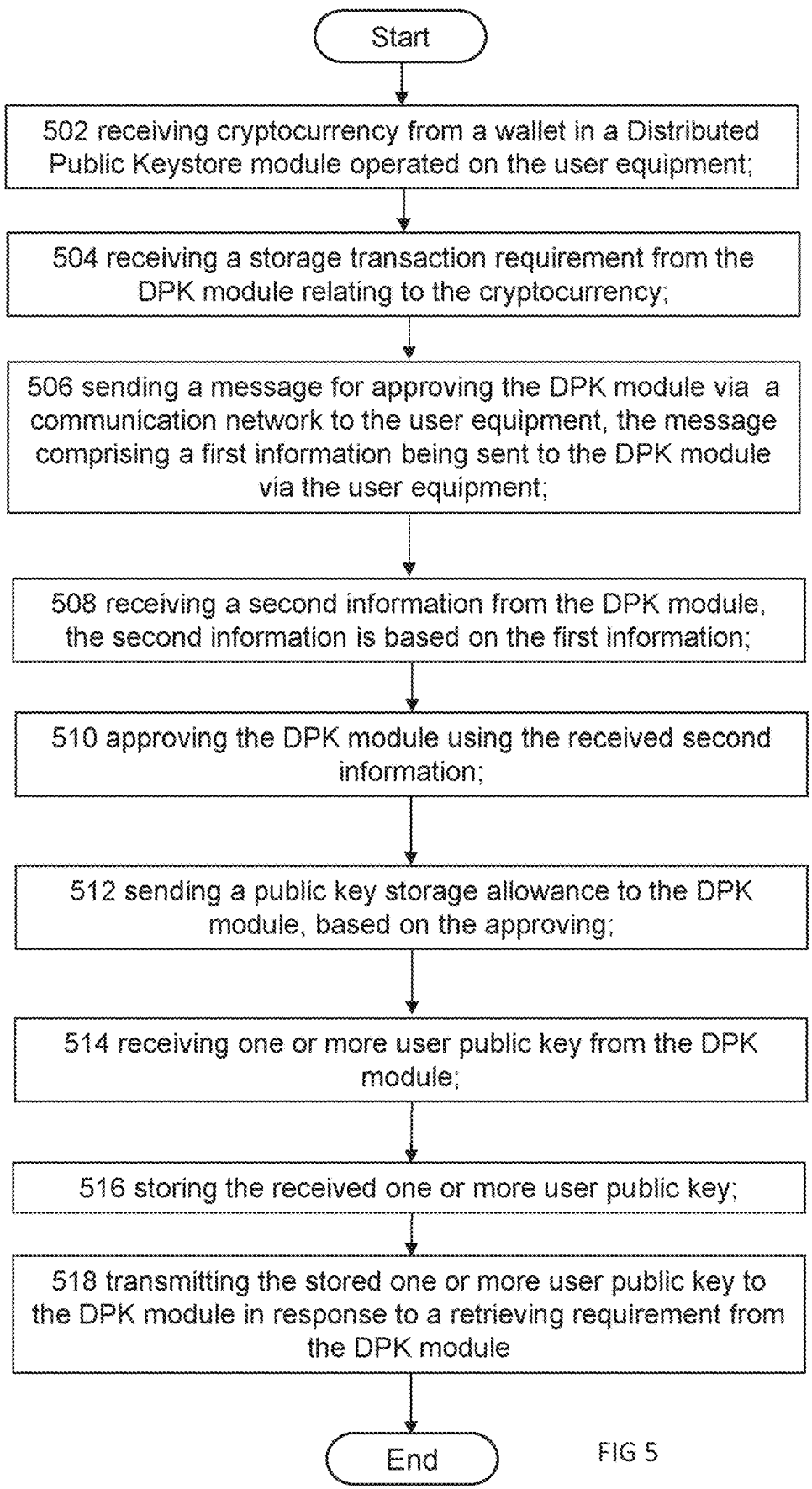
FIG. 5 is a flow chart illustrating a procedure in a blockchain, according to further possible embodiments.

FIG. 5 is a flow chart illustrating a procedure in a blockchain, according to further possible embodiments. The blockchain is communicatively connected to the DPK module. In a preferred embodiment, the blockchain is Ethereum. The method comprising:

Step 502: receiving cryptocurrency from a wallet 110, 210, 310 in a Distributed Public Keystore module 106, 206, 306, 606 operated on the user equipment 102, 202, 302. In a preferred embodiment, the cryptocurrency is Ether.

Step 504: receiving a storage transaction requirement from the DPK module 106, 206, 306, 606 relating to the cryptocurrency.

Step 506: sending a message for approving the DPK module 106, 206, 506 via a communication network to the user equipment 102, 202, the message comprising a first information being sent to the DPK module 106, 206, 306, 606 via the user equipment 102, 202, 302.

The first information can be a PIN or other unique password. In a preferred embodiment, The PIN/password can be explicitly included the message. In another embodiment, actual PIN/password cannot be obtained directly from the message. Instead, the actual PIN/password can be obtained by using the information comprised in the message. For example, the user inputs the information comprised in the message into a hardware "Authorization Token" and the "Authorization Token" generates the actual PIN/password for the user. In a preferred embodiment, the message is sent as/via SMS or cloud messaging. In a another preferred embodiment, the message is sent from the blockchain 114, 214, 314, 614 via a secure interface 118, 218, 318 and a communication network to the user equipment 102, 202, 302. The secure interface 118, 218, 318 provides a secure connection to an external network. In a preferred embodiment, the secure interface 118, 218, 318 is an Oraclize contract.

In another embodiment, the first information is a random number N1. The random number N1 is generated by the blockchain 114, 214, 314, 614 and comprised in a message. The message is sent by the blockchain 114, 214, 314, 614 to the user equipment 102, 202, 302, preferably via cloud messaging and application server or via SMS. In a preferred embodiment, the random number is generated by the secure interface 118, 218, 318, e.g., Oraclize contract.

Step 508: receiving a second information from the DPK module 106, 206, 306, 606, the second information is based on the first information.

In a preferred embodiment, if the first information is a PIN/password, the second information is also a PIN/password which is exactly the same as the first information. In another embodiment, if the first information is the random number N1, the second information is the random number N2 and the function H (N1, N2), preferably sent via different routes.

Step 510: approving the DPK module 106, 206, 306, 606 using the received second information. In a preferred embodiment, the second information is a PIN/password, the blockchain 114, 214, 314, 614 compares whether the received PIN/password is consistent with the sent PIN/password. If so, the DPK module 106, 206, 306, 606 is approved. In another embodiment, the second information is a random number N2 and a function H (N1, N2), the blockchain 114, 214, 314, 614 generates an own function H' (N1, N2) based on the N1 generated earlier and the received N2. The function H' is preinstalled in the blockchain 114, 214, 314, 614 and is the same as the function H on the DPK module 106, 206, 306, 606. If the result of the H' (N1, N2) is consistent with the received H (N1, N2), the DPK module 106, 206, 306, 606 is approved.

Step 512: sending a public key storage allowance to the DPK module 106, 206, 306, 606, based on the approving.

Step 514: receiving one or more user public key from the DPK module 106, 206, 306, 606.

Step 516: storing the received one or more user public key.

Step 518: transmitting the stored one or more public key to the DPK module 106, 206, 306, 606 in response to a retrieving requirement from the DPK module 106, 206, 306, 606.

Figure 6A:
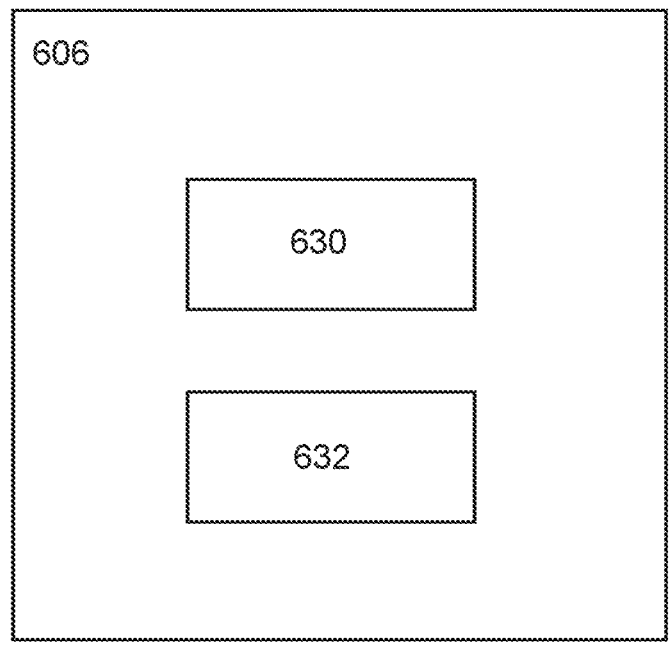
FIGS. 6a and 6b are block diagrams illustrating a DPK module and a blockchain in more detail respectively, according to further possible embodiments.
Figure 6B:
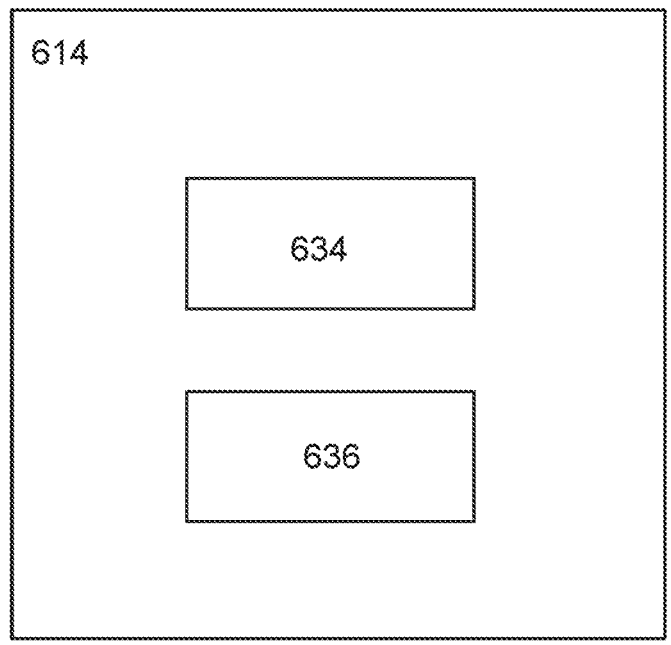

FIGS. 6a and 6b are block diagrams illustrating a DPK module and a blockchain, respectively, in more detail, according to further possible embodiments.

According to embodiments, the DPK module 106, 206, 306, 606 is operable on the user equipment 102, 202, 302 and configured for two-way communication with a blockchain 114, 214, 314, 614. The DPK module 106, 206, 306, 606 may comprises a processing unit 630 and a memory 632. The memory 632 contains instructions executable by the processing unit 630, whereby the DPK module 106, 206, 306, 606 is operative for performing any of the steps mentioned in relation to FIG. 4.

The instructions executable by said processing unit 630 may be arranged as a computer program stored e.g., in said memory 632. The processing unit 630 and the memory 632 may be arranged in a sub-arrangement. The sub-arrangement may be a micro-processor and adequate software and storage therefore, a Programmable Logic Device, PLD, or other electronic component(s)/processing circuit(s) configured to perform the methods mentioned above. The processing unit 630 may comprise one or more programmable processor, application-specific integrated circuits, field programmable gate arrays or combinations of these adapted to execute instructions.

The computer program in the memory 632 may be arranged such that when its instructions are run in the processing unit 630, they cause the DPK module 106, 206, 306, 606 to perform the steps described in any of the described embodiments of the DPK module 106, 206, 306, 606 and its method. The computer program may be carried by a computer program product connectable to the processing unit 630. The computer program product may be the memory 632, or at least arranged in the memory. The memory 632 may be realized as for example a RAM (Random-access memory), ROM (Read-Only Memory) or an EEPROM (Electrical Erasable Programmable ROM). In some embodiments, a carrier may contain the computer program. The carrier may be one of an electronic signal, an optical signal, an electromagnetic signal, a magnetic signal, an electric signal, a radio signal, a microwave signal, or computer readable storage medium. The computer-readable storage medium may be e.g., a CD, DVD or flash memory, from which the program could be downloaded into the memory 632. Alternatively, the computer program may be stored on a server or any other entity to which the DPK module 106, 206, 306, 606 has access via a communication interface. The computer program may then be downloaded from the server into the memory 632.

According to the embodiments, a blockchain 114, 214, 314, 614 is configured for two-way communication with a number of user equipment 102, 202, 302 and communication networks, the blockchain 114, 214, 314, 614 comprising a processing unit 634 and a memory 636, the memory 636 containing instructions executable by said processing unit 634, whereby the blockchain 114, 214, 314, 614 is operative for performing any of the steps mentioned in relation to FIG. 5.

The computer program in the memory 636 may be arranged such that when its instructions are run in the processing unit 634, they cause the blockchain 114, 214, 314, 614 to perform the steps described in any of the described embodiments of the blockchain 114, 214, 314, 614 and its method. The instructions executable by said processing unit 634 may be arranged as a computer program stored e.g., in said memory 636. The processing unit 634 and the memory 636 may be arranged in a sub-arrangement. The sub-arrangement may be a micro-processor and adequate software and storage therefore, a Programmable Logic Device, PLD, or other electronic component(s)/processing circuit(s) configured to perform the methods mentioned above. The processing unit 634 may comprise one or more programmable processor, application-specific integrated circuits, field programmable gate arrays or combinations of these adapted to execute instructions.

The computer program in the memory 636 may be arranged such that when its instructions are run in the processing unit 634, they cause the blockchain 114, 214, 314, 614 to perform the steps described in any of the described embodiments of the blockchain 114, 214, 314, 614 and its method. The computer program may be carried by a computer program product connectable to the processing unit 634. The computer program product may be the memory 636, or at least arranged in the memory. The memory 636 may be realized as for example a RAM (Random-access memory), ROM (Read-Only Memory) or an EEPROM (Electrical Erasable Programmable ROM). In some embodiments, a carrier may contain the computer program. The carrier may be one of an electronic signal, an optical signal, an electromagnetic signal, a magnetic signal, an electric signal, a radio signal, a microwave signal, or computer readable storage medium. The computer-readable storage medium may be e.g., a CD, DVD or flash memory, from which the program could be downloaded into the memory 636. Alternatively, the computer program may be stored on a server or any other entity to which the blockchain 114, 214, 314, 614 has access via a communication interface. The computer program may then be downloaded from the server into the memory 636.

FIG. 7 is a signaling diagram illustrating an example of a procedure when the solution is performed, according to further possible embodiments.

A Token 7.1 of the DPK module 706 is sent by the DPK module 706 to the PKM 728. After the PKM 728 approves the Token, cryptocurrency 7.2 is sent by the PKM 728 to the DPK module 706. The DPK module 706 generates or obtains user public keys 7.3 from one or more applications. The DPK module 706 transmits the cryptocurrency 7.4 to the blockchain 714. The cryptocurrency is related to the storage transaction requirement 7.5 which is sent from the DPK module 706 to the blockchain 714. The blockchain 714 sends a message 7.6 to the user equipment 702. The message 7.6 relates to a future approval of the storage transaction requirement. On receiving the message 7.6, the user equipment 702 obtains a first information from the message and transmits the first information 7.7 to the DPK module 706. The DPK module 706 transmits a second information 7.8 to the blockchain 714. The second information is based on the first information. After the second information 7.8 is approved by the blockchain 714, a Public Key Storage Allowance 7.9 is transmitted to the DPK module 706. Then the User Public Keys 7.10 are sent to the blockchain 714 for storing. The User Public Keys 7.11 are retrieved by the DPK module 706 when needed.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Further, the term "a number of", such as in "a number of wireless devices" signifies one or more devices. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a Distributed Public Keystore (DPK) module operated on a user equipment connected to a communication network, the method comprising:
    transmitting a Token of the DPK module to an external device having cryptocurrency so the external device can approve the DPK module;
    obtaining cryptocurrency from the external device to a wallet of the DPK module, in response to an approval of the Token by the external device;
    obtaining one or more user public key on the user equipment;
    transmitting the cryptocurrency in the wallet of the DPK module to a blockchain;
    sending a storage transaction requirement to the blockchain relating to the cryptocurrency;
    receiving a first information from the user equipment, the first information originating from a message received from the blockchain, the message being received via the communication network to the user equipment, the first information being related to approval by the blockchain of the storage transaction requirement;
    sending a second information based on the first information to the blockchain for approval;
    receiving from the blockchain, a public key storage allowance, relating to the approval by the blockchain of the sent storage transaction requirement based on the sent second information;
    sending the one or more user public key to the blockchain for storage in the blockchain, based on the public key storage allowance; and
    retrieving the one or more stored public key from the blockchain when the one or more public key is needed by the DPK module.

2. A method as claimed in claim 1, wherein the message received from the blockchain via the communication network is received as a short message service (SMS) text.

3. A method as claimed in claim 1, wherein the message received from the blockchain via the communication network is received as/via Cloud messaging.

4. A method as claimed in claim 1, wherein the method further includes generating the second information based on the received first information.

5. A method as claimed in claim 4, wherein, the first information is a random number N1 comprised in the message and the generated second information includes a random number N2 and a function H calculated with the input N1 and N2, the random number N2 being generated by the DPK module.

6. A method as claimed in claim 1, wherein the wallet in the DPK module includes a wallet address, the wallet address is a unique identifier for the DPK module relating to the transmission of the cryptocurrency from the wallet to the blockchain.

7. A method as claimed in claim 1, wherein the obtaining, sending and retrieving of the one or more user public key also includes obtaining, sending and retrieving user information related to an application on the user equipment.

8. A non-transitory computer-readable storage medium, the computer-readable storage medium including computer program logic that when executed by at least one processing unit causes the at least one processing unit to perform the method of claim 1.

9. A method performed by a blockchain of a communication network, the blockchain being connected to a user equipment, the method comprising:
    receiving cryptocurrency from a Distributed Public Keystore (DPK) module operated on the user equipment;
    receiving a storage transaction requirement from the DPK module relating to the cryptocurrency;
    sending a message for approving the DPK module via a communication network to the user equipment, the message comprising a first information being sent to the DPK module via the user equipment;
    receiving a second information from the DPK module, the second information is based on the first information;
    approving the DPK module using the received second information;
    sending a public key storage allowance to the DPK module, based on the approving;
    receiving one or more user public key from the DPK module;
    storing the received one or more user public key; and
    transmitting the stored one or more user public key to the DPK module in response to a retrieving requirement from the DPK module.

10. A method as claimed in claim 9, wherein the message for approving the DPK module sent via the communication network is also sent via a secure interface to the user equipment, the secure interface is an Oraclize contract interfacing to external networks of the blockchain.

11. A method as claimed in claim 9, wherein the message for approving the DPK module is sent as a short message service (SMS) message.

12. A method as claimed in claim 9, wherein the message for approving the DPK module is sent as/via cloud messaging.

13. A method as claimed in claim 9, wherein the first information is a random number N1 comprised in the sent message and the received second information includes a random number N2 and a function H calculated with the input N1 and N2, the random number N2 being generated by the DPK module and the function H being calculated by the DPK module, wherein approving the DPK module using the received second information comprises calculating a function H' with the input N1 and N2, and comparing the function H' with the received H, the function H' being preinstalled in the blockchain and the same as the function H in the DPK module.

14. A method as claimed in claim 9, wherein the receiving, storing and transmitting one or more user public key also includes receiving, storing and transmitting user information related to an application on the user equipment.

15. A non-transitory computer-readable storage medium, the computer-readable storage medium including computer program logic that when executed by at least one processing unit of a blockchain, causes the at least one processing unit to perform the method of claim 9.

\* \* \* \* \*